(No Model.)
B. BOLEY.
BOTTLE STOPPER.
No. 521,779. Patented June 26, 1894.
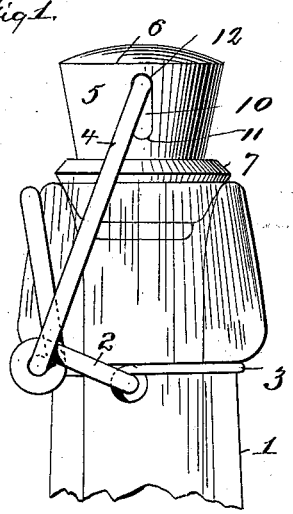
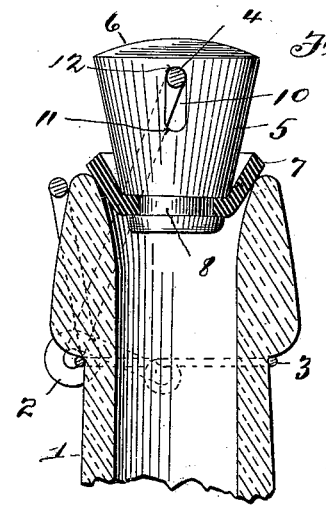
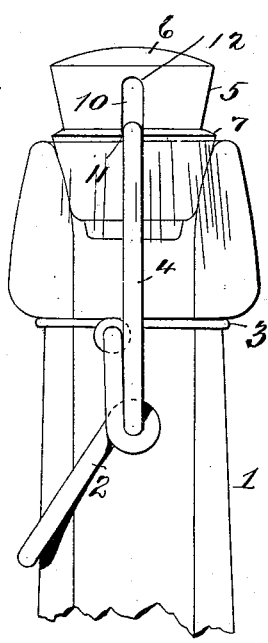
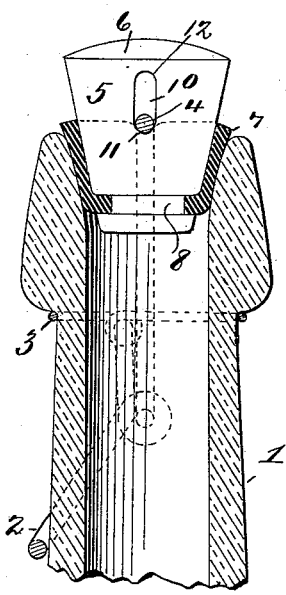
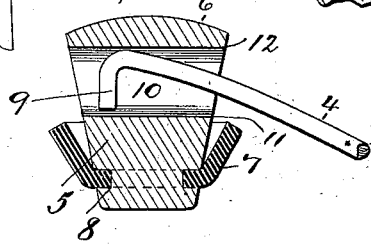
Attest:
C. W. Benjamin
B. S. Wise
Inventor:
Benjamin Boley
by Joseph L. Levy
atty
THE NATIONAL LITHOGRAPHING COMPANY,
WASHINGTON, D. C.

UNITED STATES PATENT OFFICE.

BENJAMIN BOLEY, OF BROOKLYN, NEW YORK.

BOTTLE-STOPPER.

SPECIFICATION forming part of Letters Patent No. 521,779, dated June 26, 1894.

Application filed October 23, 1893. Serial No. 488,964. (No model.)

*To all whom it may concern:*

Be it known that I, BENJAMIN BOLEY, a citizen of the United States, residing at Brooklyn, in the county of Kings and State of New York, have made certain new and useful Improvements in Bottle-Stoppers, of which the following is a specification.

My invention relates to the class of bottle stoppers wherein the stopper or plug is carried by a bail that is pivotally connected with a lever hinged on the bottle neck, and the invention has reference more particularly to the class of stoppers that are provided with an opening for the bail that is larger than the wire of the bail to permit its ready connection therewith. Such a construction is shown in United States patent granted to Karl Hutter, No. 491,113, dated February 7, 1893, but in said patent the greatest diameter of the opening for the bail is transverse to the longitudinal axis of the stopper. With this construction, therefore, the bail will have a lateral movement on the stopper and tend at times to draw from a point at one side of the vertical axis of the stopper, thus tilting the stopper sidewise when the bail is drawn down unless the stopper be nicely fitted into the bottle neck before the bail is fastened. In opening the bottle also the tendency of the bail is to slide horizontally of the stopper and to thus give the latter a side motion rather than a direct lifting action, whereby the complete opening of the bottle at times by the bail is prevented.

The object of my invention, therefore, is to provide a stopper with an opening of sufficient size to admit the bail in its finished form while providing a direct vertical draft upon the stopper by the bail.

Another object of the invention is to so arrange said opening in the stopper as to prevent side motion of the bail on the stopper while insuring the proper lifting of the stopper by the bail.

The invention consists in a stopper or plug provided with a centrally located vertically extending opening arranged to permit the entrance of the bent end of a bail and to permit lateral play of the bail in said opening.

The invention further consists in the novel details of improvement and the combinations of parts that will be more fully hereinafter set forth and then pointed out in the claims.

Reference is to be had to the accompanying drawings forming part hereof, wherein—

Figure 1 is a side elevation of my improved stopper shown applied to a bottle neck, and before it is pressed to its seat. Fig. 2 is a corresponding view partly in section. Fig. 3 is a view corresponding to Fig. 1, showing the stopper pressed to its seat. Fig. 4 is a similar view partly in section, and Fig. 5 is a central section of the stopper, showing the manner of attaching its bail.

In the accompanying drawings, in which similar numerals of reference indicate corresponding parts in the several figures, 1 indicates the neck of a suitable bottle; 2 is a lever pivoted thereon by a neck-ring 3, and 4 is a bail pivotally carried by the lever 2. The above parts may be of ordinary or well known construction, and need no further specific description.

5 indicates my improved stopper or plug which is shown in taper or conical form having a suitably shaped top or head 6, upon which a suitable inscription may be placed if desired. The plug 5 may be provided with a suitable gasket, washer or ring 7 to make a tight joint between the bottle neck and the stopper, the stopper or plug 5 being shown provided with a suitable annular groove 8 to receive the gasket or washer 7, but of course the gasket or washer may be arranged in any desired manner.

The bail 4 is shown passing through the main part of the stopper 5, and the latter is of greater diameter than the thickness of the wire, and in order to permit the bend 9 at the end of the bail 4 to be passed through said stopper, I provide the latter with a slot or opening 10 of a length sufficient to permit the passage of said bent end of the bail, as in Fig. 5. This opening 10 in the stopper or plug is elongated or oblong, and its greatest diameter extends in a plane coincident with the longitudinal axis of the stopper, or in other words, the opening 10 lies in the longitudinal axis of the stopper or extends vertically when the stopper is in position on the bottle neck. The opening 10 is of a sufficient width to permit movement of the bail longitudinally of the stopper, but so narrow as to prevent excessive lateral movement thereon. By this means the movement of the bail in the opening 10 of the stopper or plug 5 is confined to the longitudinal axis of the stopper, which insures a direct longitudinal pull or strain on the stopper when the lever 2 is moved to actuate the bail 4.

By the use of the vertically extending oblong opening or slot 10 in the stopper the bail 4 is caused to find its seat positively in the lower edge 11 of said opening when the bail is drawn down, which seat, being in the longitudinal axis of the stopper, causes a direct action of the stopper in the bottle neck, and prevents said stopper from tilting when being applied. In opening the bottle the bail rides vertically in the opening until it reaches the upper edge 12 of the latter, when the stopper will be lifted directly outwardly from the bottle neck. This positive action of the bail on the stopper is caused by the narrowness of the opening 10 in the stopper. In the above mentioned patent, No. 491,113, the opening in the stopper has its greatest diameter lying transversely to the longitudinal axis of the stopper, which permits the bail to have movement in the stopper in the said transverse direction, whereby a downward or upward movement of the bail is converted into a side motion, or the bail is not confined to a movement in a line coincident with the longitudinal axis of the stopper. Hence the tendency of the bail is to tilt the stopper in the bottle neck, and unless care is taken to hold the stopper in proper position in the bottle neck, when the bail is drawn down, the stopper is liable to be tilted and fit improperly in the neck.

It will be observed that the bend 9 in the bail 4 lies in the plane of the greatest diameter of the opening 10 in the bottle stopper when the parts are in the normally closed positions as in Figs. 3 and 4, whereby when the bail is passed through the opening 10 it will be in the proper position for attachment to the lever 2.

Having now described my invention, what I claim is—

1. In a bottle stopper, the combination of a part adapted to be stationarily secured to the bottle neck, a plug having an upwardly elongated or slotted aperture transversely therethrough, a bail passed through said aperture, and an operative connection between said bail and stationary part for drawing the bail, and with it the plug, down toward said stationary part, the width of said aperture, transverse to its direction of elongation, being substantially that of the bail, whereby the bail is restricted to an up and down movement in said aperture, substantially as described.

2. In a bottle stopper, the combination of a plug having an elongated or slotted aperture whereof one end is located in a diametral plane of said plug, a bail passed through said slot, and means, adapted to be secured to the bottle neck, for drawing the bail bodily downward thereto, substantially as described.

3. In a bottle stopper, the combination of a plug having an elongated or slotted aperture whereof both ends are located in a diametral plane of said plug, a bail passed through said slot, and means, adapted to be secured to the bottle neck, for drawing the bail bodily downward thereto, substantially as described.

Signed at the city, county, and State of New York this 16th day of October, 1893.

BENJAMIN BOLEY.

Witnesses:
B. S. WISE,
JOSEPH L. LEVY.